United States Patent
Bietz et al.

(10) Patent No.: US 12,329,052 B2
(45) Date of Patent: Jun. 17, 2025

(54) AGRICULTURAL HEADER WITH DOLLY CARRIED BY GAUGE WHEEL ARM

(71) Applicant: CNH Industrial America LLC, New Holland, PA (US)

(72) Inventors: Seth Bietz, Bettendorf, IA (US); David M. DeChristopher, Ephrata, PA (US); Renato Ribeiro, Campo Largo (BR)

(73) Assignee: CNH Industrial America LLC, New Holland, PA (US)

( * ) Notice: Subject to any disclaimer, the term of this patent is extended or adjusted under 35 U.S.C. 154(b) by 618 days.

(21) Appl. No.: 17/699,940

(22) Filed: Mar. 21, 2022

(65) Prior Publication Data
US 2022/0304217 A1    Sep. 29, 2022

Related U.S. Application Data

(60) Provisional application No. 63/164,708, filed on Mar. 23, 2021.

(51) Int. Cl.
   *A01B 73/00*    (2006.01)
   *A01D 41/06*    (2006.01)
   *A01D 75/00*    (2006.01)

(52) U.S. Cl.
   CPC .......... *A01B 73/005* (2013.01); *A01D 41/06* (2013.01); *A01D 75/002* (2013.01)

(58) Field of Classification Search
   CPC .... A01B 73/00; A01B 73/005; A01D 75/002; A01D 41/06; A01D 41/14; A01D 41/144; A01D 41/142; A01D 75/004; A01D 75/006; A01D 41/145; B62D 43/02
   See application file for complete search history.

(56) References Cited

U.S. PATENT DOCUMENTS

| | | | |
|---|---|---|---|
| 6,209,297 B1 | 4/2001 | Yeomans et al. | |
| 7,197,865 B1 | 4/2007 | Enns et al. | |
| 8,025,312 B1 * | 9/2011 | Honas | A01D 75/002 |
| | | | 56/228 |
| 9,386,748 B2 | 7/2016 | Cook et al. | |
| 10,405,481 B2 | 9/2019 | Chen et al. | |
| 2020/0008341 A1 | 1/2020 | Madarasi et al. | |
| 2021/0307247 A1 * | 10/2021 | Lyons | A01D 75/004 |

FOREIGN PATENT DOCUMENTS

GB    1346122 A    2/1974

* cited by examiner

*Primary Examiner* — Scott A Browne
*Assistant Examiner* — Jisun Choi
(74) *Attorney, Agent, or Firm* — Peter K. Zacharias; Rebecca L. Henkel; Rickard K. DeMille

(57) ABSTRACT

An agricultural header includes: a header frame; at least one cutter carried by the header frame and configured to cut crop material; and a transport assembly coupled to the header frame and including: a gauge wheel arm pivotably coupled to the header frame and pivotable between a transport position and a working position; and a dolly coupled to the gauge wheel arm and including a pair of dolly wheel mounts configured to mount a pair of wheels thereto. The dolly is coupled to the gauge wheel arm such that the dolly is carried by the gauge wheel arm between the transport position and the working position and is swivelable about a swivel axis extending through the gauge wheel arm when the gauge wheel arm is in the transport position.

14 Claims, 15 Drawing Sheets

AGRICULTURAL HEADER WITH DOLLY CARRIED BY GAUGE WHEEL ARM

BACKGROUND OF THE INVENTION

An agricultural harvester known as a "combine" is historically termed such because it combines multiple harvesting functions with a single harvesting unit, such as picking, threshing, separating, and cleaning. A combine includes a header which removes the crop from a field, and a feeder housing which transports the crop matter into a threshing rotor. The threshing rotor rotates within a perforated housing, which may be in the form of adjustable concaves, and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue handling system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like, and an unloading system on the combine is actuated to transfer the grain into the vehicle.

More particularly, a rotary threshing or separating system includes one or more rotors that can extend axially (front to rear) or transversely (side to side) within the body of the combine, and which are partially or fully surrounded by perforated concaves. The crop material is threshed and separated by the rotation of the rotor within the concaves. Coarser non-grain crop material such as stalks and leaves pass through a straw beater to remove any remaining grains, and then are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve), where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material which passes through the upper sieve, but does not pass through the lower sieve, is directed to a tailings pan. Grain falling through the lower sieve lands on a bottom pan of the cleaning system, where it is conveyed forwardly toward a clean grain auger. The clean grain auger conveys the grain to a grain elevator, which transports the grain upwards to a grain tank for temporary storage. The grain accumulates to the point where the grain tank is full and is discharged to an adjacent vehicle such as a semi trailer, gravity box, straight truck or the like by an unloading system on the combine that is actuated to transfer grain into the vehicle.

Many known headers have operating widths of 40 feet or greater that make the headers unsuitable for transport on public roads in the operating position. In order to transport such headers on public roads, the header must be transported at an orientation that is perpendicular to the normal operating orientation. To stabilize the header in the transport orientation, one or more transport wheel assemblies are deployed. While such transport wheel assemblies are effective, deploying the assemblies, and storing the assemblies when they are no longer needed, is often cumbersome. Automatic systems have been developed to deploy and store the transport wheel assemblies, but these automatic systems can be too expensive and complicated for many users to adopt.

What is needed in the art is an agricultural header that addresses some of the previously described issues with known agricultural headers.

SUMMARY OF THE INVENTION

Exemplary embodiments provided according to the present disclosure include a transport assembly with a gauge wheel arm that has a dolly coupled to the gauge wheel arm that is carried by the gauge wheel arm between a transport position and a working position.

In some exemplary embodiments provided according to the present disclosure, an agricultural header for an agricultural vehicle includes: a header frame; at least one cutter carried by the header frame and configured to cut crop material; and a transport assembly coupled to the header frame. The transport assembly includes: a gauge wheel arm pivotably coupled to the header frame and pivotable between a transport position and a working position; and a dolly coupled to the gauge wheel arm and including a pair of dolly wheel mounts configured to mount a pair of wheels thereto. The dolly is coupled to the gauge wheel arm such that the dolly is carried by the gauge wheel arm between the transport position and the working position and is swivelable about a swivel axis extending through the gauge wheel arm when the gauge wheel arm is in the transport position.

In some exemplary embodiments provided according to the present disclosure, an agricultural vehicle includes a chassis and a header carried by the chassis. The header includes: a header frame; at least one cutter carried by the header frame and configured to cut crop material; and a transport assembly coupled to the header frame. The transport assembly includes: a gauge wheel arm pivotably coupled to the header frame and pivotable between a transport position and a working position; and a dolly coupled to the gauge wheel arm and including a pair of dolly wheel mounts configured to mount a pair of wheels thereto. The dolly is coupled to the gauge wheel arm such that the dolly is carried by the gauge wheel arm between the transport position and the working position and is swivelable about a swivel axis extending through the gauge wheel arm when the gauge wheel arm is in the transport position.

One possible advantage that may be realized by exemplary embodiments provided according to the present disclosure is that the dolly is carried by the gauge wheel arm and thus does not need to be removed from the gauge wheel arm when it is desired to transport the header, which is less cumbersome for a user.

Another possible advantage that may be realized by exemplary embodiments provided according to the present disclosure is that the gauge wheel arm can be quickly unlocked and pivoted between the transport position and the working position.

Yet another possible advantage that may be realized by exemplary embodiments provided according to the present disclosure is that the transport assembly can be easily retrofitted to known headers and, optionally, be used in conjunction with one or more hydraulic systems on the header.

BRIEF DESCRIPTION OF THE DRAWINGS

For the purpose of illustration, there are shown in the drawings certain embodiments of the present invention. It should be understood, however, that the invention is not limited to the precise arrangements, dimensions, and instruments shown. Like numerals indicate like elements throughout the drawings. In the drawings.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also, the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting. The terms "downstream" and "upstream" are determined with reference to the intended direction of crop material flow during operation, with "downstream" being analogous to "rearward" and "upstream" being analogous to "forward."

Figure 1:
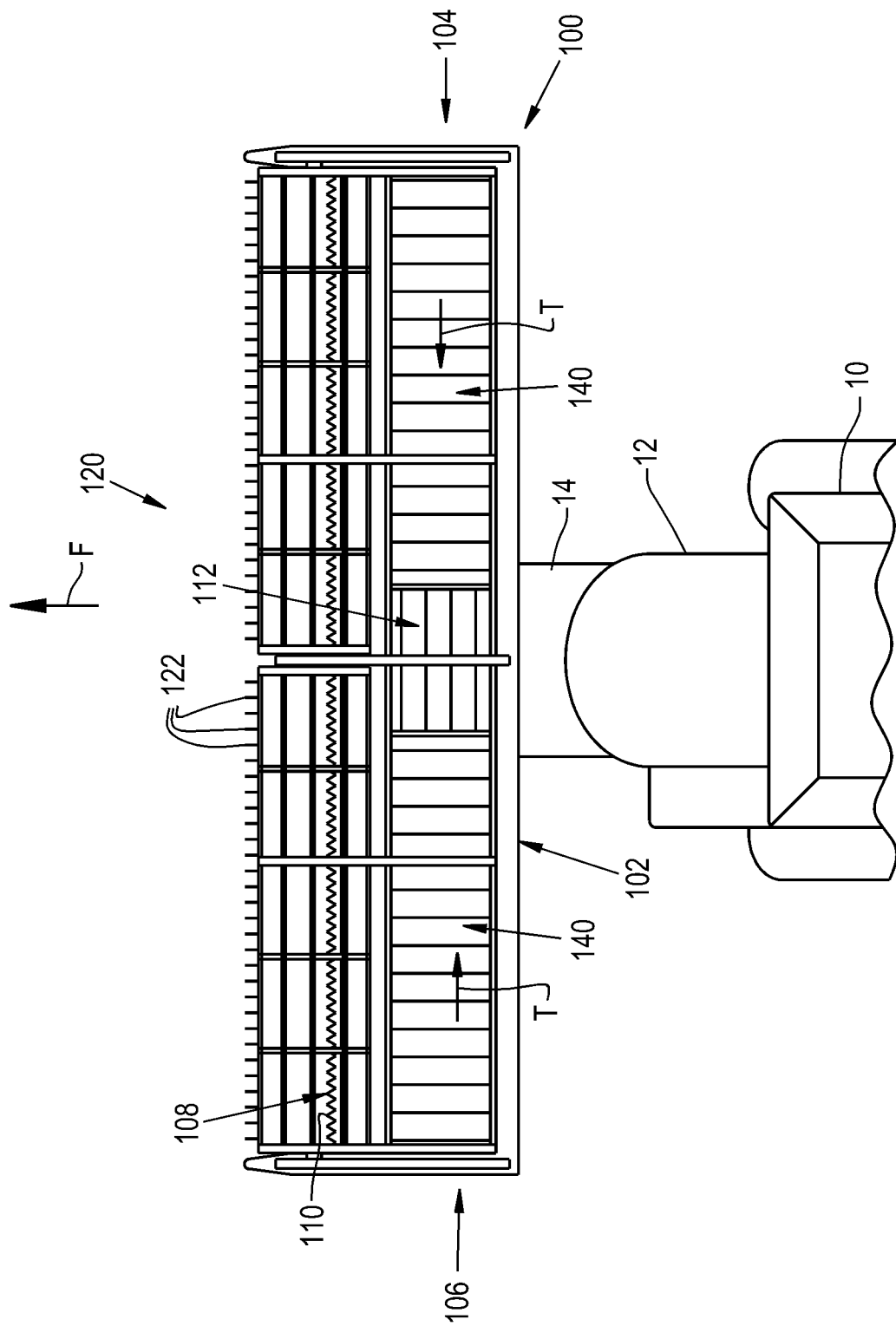
FIG. 1 illustrates a top view of an exemplary embodiment of an agricultural vehicle, the agricultural vehicle comprising an agricultural header, in accordance with an exemplary embodiment of the present disclosure.

Referring now to the drawings, and more particularly to FIG. 1, there is shown an exemplary embodiment of an agricultural vehicle 10 in the form of a combine harvester which generally includes a chassis 12, a feeder housing 14, and an attachment in the form of a header 100. Typically, the combine harvester 10 will include additional internal systems for the separation and handling of collected crop material, but these additional systems are omitted from view for brevity of description. It should be appreciated that the header 100 described and illustrated herein does not necessarily need to be included on combine harvesters, but can be incorporated in other agricultural vehicles such as windrowers. Further, while the exemplary embodiment of the header 100 is shown and described as a draper header, it should be appreciated that the header can be formed, in some exemplary embodiments, as an auger-type header incorporating one or more augers as the crop material conveyor(s). It should be further appreciated that while the header 100 is shown and described as being configured for harvesting wheat, in some embodiments the header is configured for harvesting other crops, such as corn.

The header 100 is coupled to the feeder housing 14 and supported by the chassis 12 of the agricultural vehicle 10. The header 100 has a header frame 102 and a pair of opposed lateral ends 104, 106. The header frame 102 supports one or more flexible cutters 108, shown as a cutter bar, with reciprocating cutting edges 110 to cut crop material as the agricultural vehicle 10 travels in a forward direction, denoted by arrow F. The header 100 may further include a center feed belt 112 or a center auger that conveys the crop material into the feeder housing 14. In one exemplary embodiment, the header 100 can include one or more lateral, flexible draper belts 140 that are positioned rearwardly of the cutter bar(s) 108 and travel, i.e. rotate, in opposing directions of travel, denoted by each arrow "T", in order to convey the crop material inwardly to the center feed belt 112 and thereby the feeder housing 14. In some exemplary embodiments, the header 100 may include a pair of counter-rotating cross augers, rather than the draper belts 140, to convey crop material laterally inward toward the center feed belt 112. The vehicle 10 may further include a reel assembly 120 with tines 122 that rotate to direct crop material to the cutter(s) 108 of the header 100, as is known.

Figure 2:
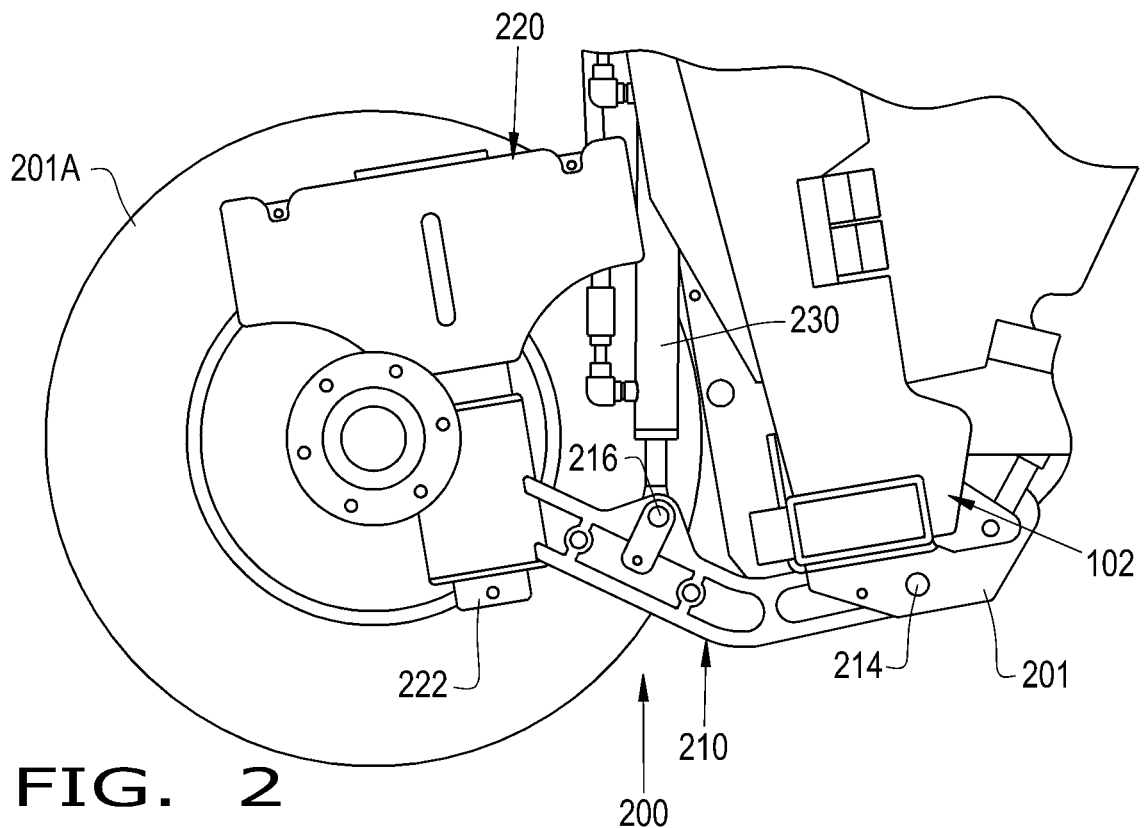
FIG. 2 illustrates a side view of an exemplary embodiment of a transport assembly of the header of FIG. 1 with a gauge wheel arm in a working position, in accordance with an exemplary embodiment of the present disclosure.
Figure 3:
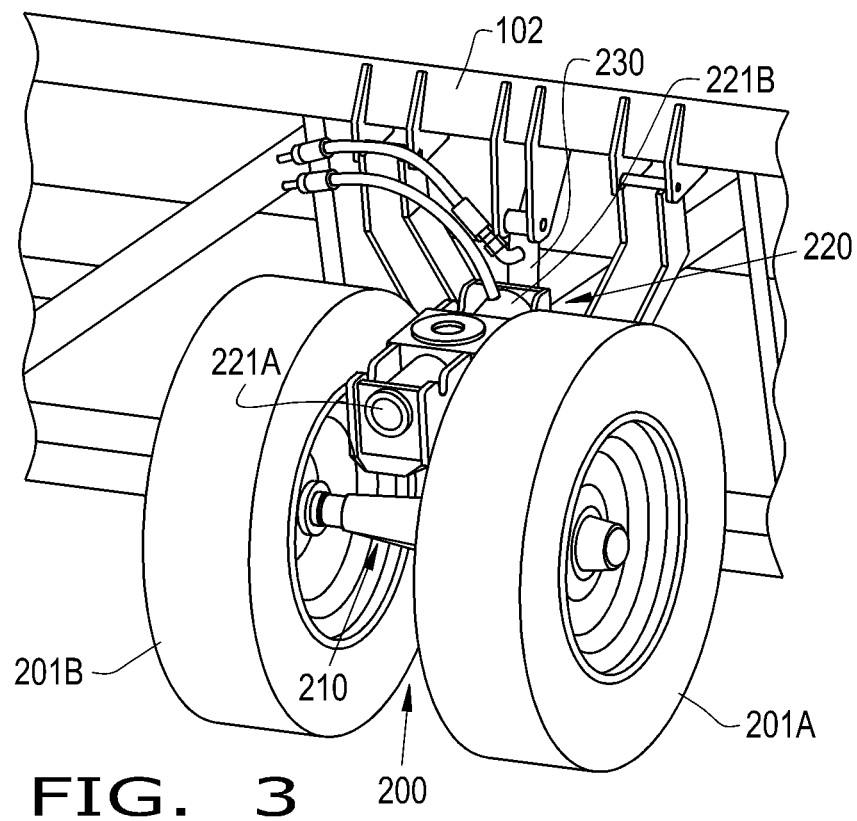
FIG. 3 illustrates a perspective view of the transport assembly of FIG. 2.
Figure 4:
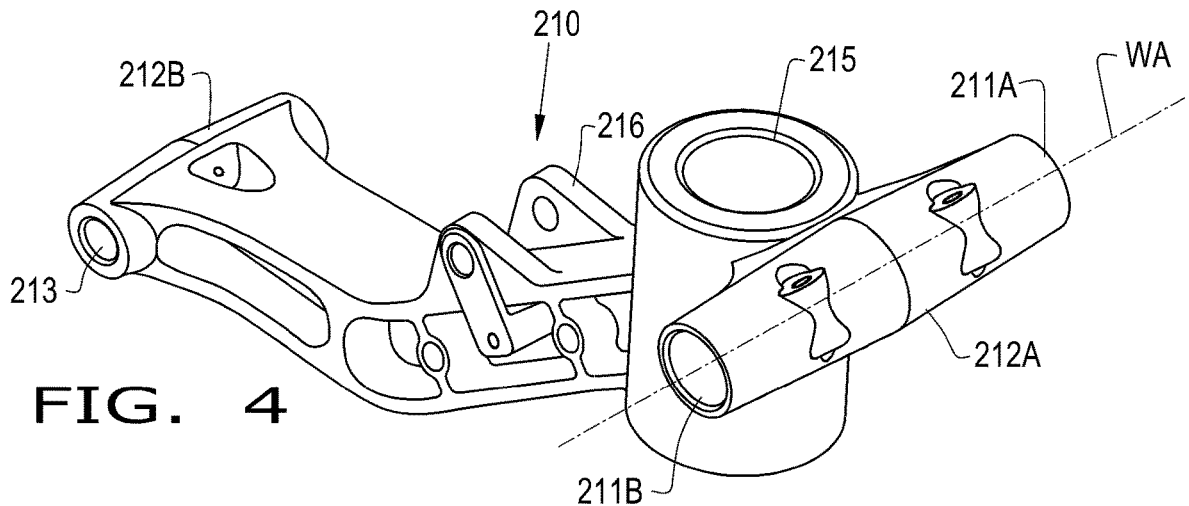
FIG. 4 illustrates a perspective view of the gauge wheel arm of the transport assembly of FIGS. 2-3, in accordance with an exemplary embodiment of the present disclosure.
Figure 5:
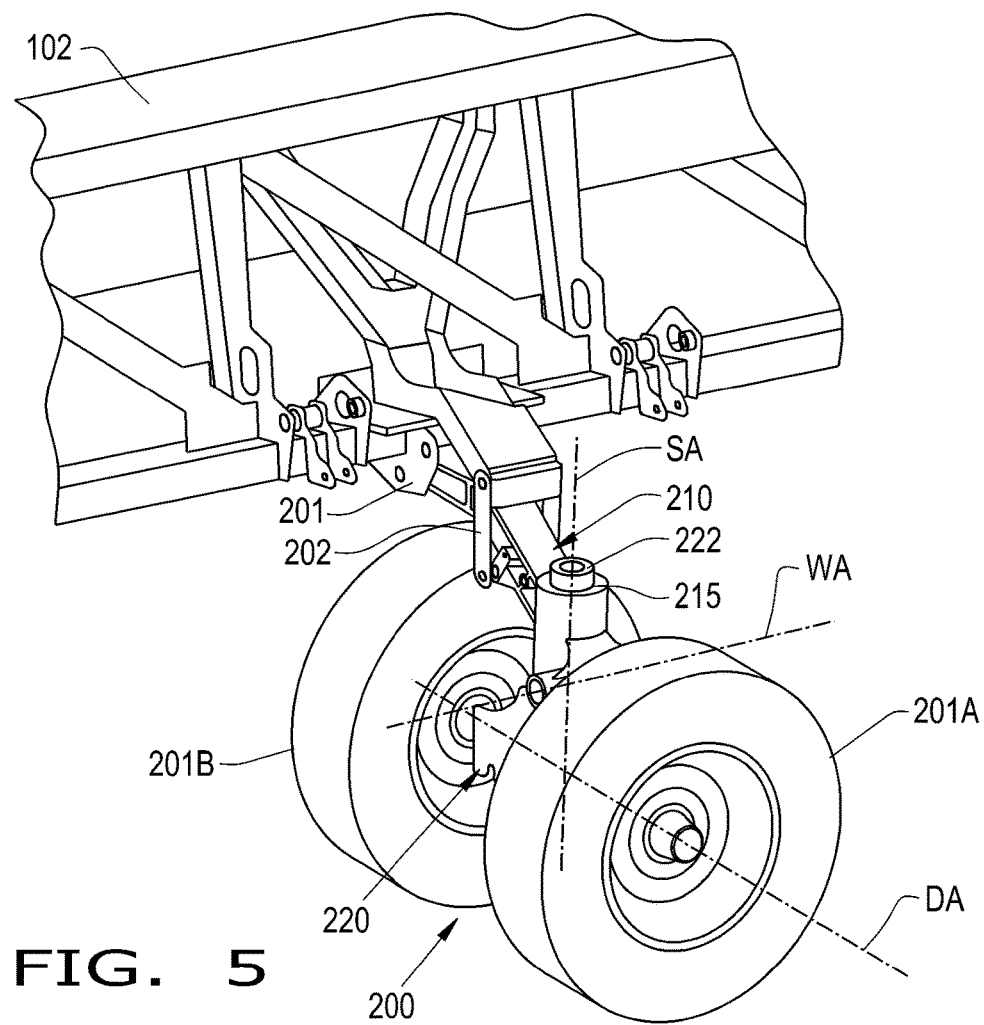
FIG. 5 illustrates a perspective view of the transport assembly of FIGS. 2-3 after pivoting the gauge wheel arm and a carried dolly to a transport position, in accordance with an exemplary embodiment of the present disclosure.
Figure 6:
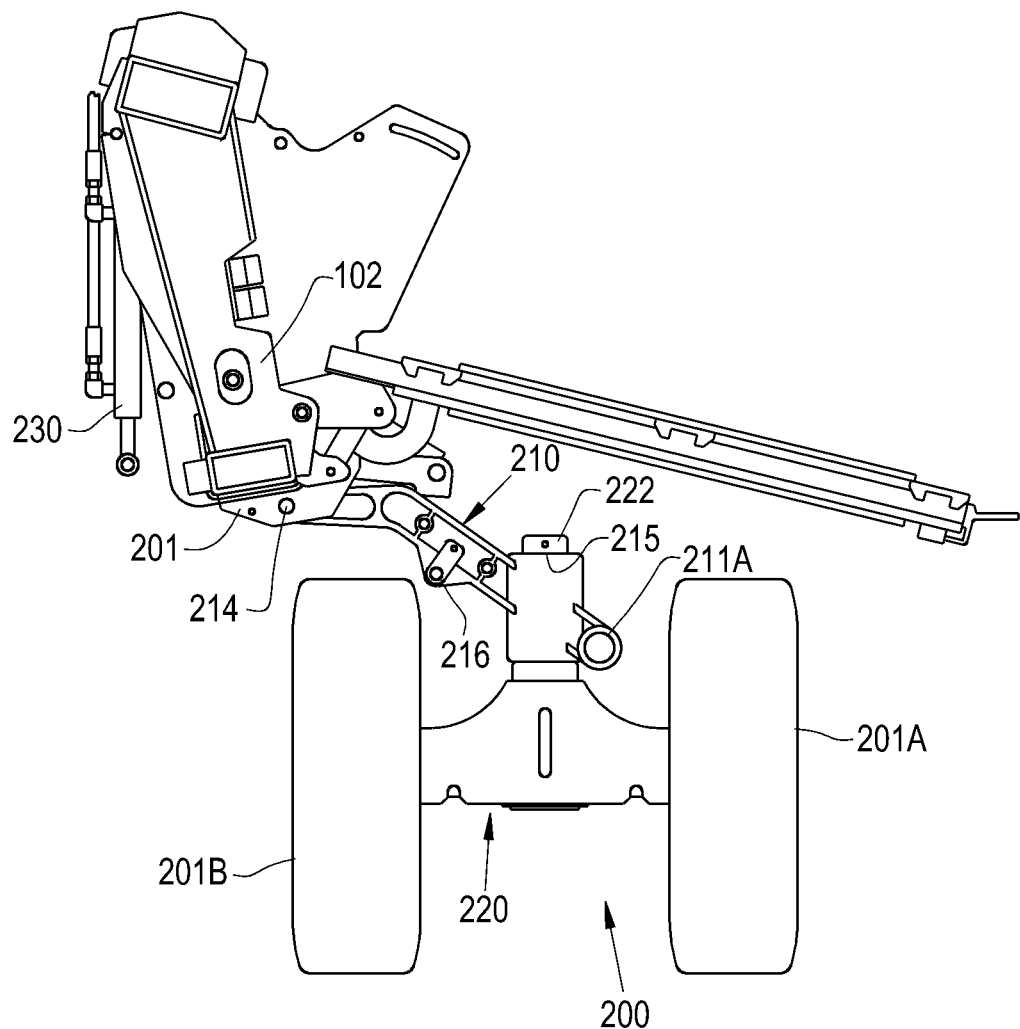
FIG. 6 illustrates another perspective view of the transport assembly of FIGS. 2-3 and 5 with the gauge wheel arm in the transport position.

Referring now to FIGS. 2-6, an exemplary embodiment of a transport assembly 200 provided according to the present disclosure is illustrated coupled to the header frame 102. The transport assembly 200 includes a gauge wheel arm 210 that is pivotably coupled to the header frame 102 and a dolly 220 that is coupled to the gauge wheel arm 210. The gauge wheel arm 210 is pivotable between a transport position, which is illustrated in FIGS. 5-6, and a working position, which is illustrated in FIGS. 2-3.

The gauge wheel arm 210 may include a pair of arm wheel mounts 211A, 211B which are configured to mount a pair of wheels 201A, 201B thereto, with the pair of wheels 201A, 201B being illustrated as coupled to the arm wheel mounts 211A, 211B in FIGS. 2-3. As illustrated in FIG. 4, the arm wheel mounts 211A, 211B may be a pair of openings 211A, 211B formed in the gauge wheel arm 210. The openings 211A, 211B may be aligned on an arm wheel axis WA; in some embodiments, the openings 211A, 211B are connected to form a through-opening that extends through the gauge wheel arm 210. The openings 211A, 211B may be located at an end 212A of the gauge wheel arm 210 that is opposite an end 212B where a pivot opening 213 is formed. The gauge wheel arm 210 may be pivotably coupled to a pivot bracket 201 that is fixed to the header frame 102 by inserting a pivot pin 214 through the pivot opening 213 and a corresponding opening in the pivot bracket 201, which pivotably couples the gauge wheel arm 210 to the header frame 102. The relative dimensions and geometries of the gauge wheel arm 210 can be adjusted in a variety of ways to meet clearance requirements for the space in which the gauge wheel arm 210 will be disposed and will pivot. It should therefore be appreciated that the gauge wheel arm 210 illustrated in FIGS. 2-6 is but one of many possible configurations that a gauge wheel arm may assume according to the present disclosure.

The dolly 220 is coupled to the gauge wheel arm 210 and is carried by the gauge wheel arm 210 between the transport position and the working position. In other words, the dolly 220 is coupled with the gauge wheel arm 210 so movement of the gauge wheel arm 210 carries the dolly 220 and the dolly 220 does not need to be disconnected from the gauge wheel arm 210 as the gauge wheel arm 210 pivots between the transport position and the working position. The dolly 220 includes a pair of dolly wheel mounts 221A, 221B configured to mount the pair of wheels, such as the wheels 201A, 201B, thereto. In this respect, the dolly wheel mounts 221A, 221B can be configured similarly to the arm wheel mounts 211A, 211B, e.g., as openings, so the wheels 201A, 201B can be coupled to both the arm wheel mounts 211A, 211B and the dolly wheel mounts 221A, 221B in a similar manner. In some embodiments, the dolly wheel mounts 221A, 221B, which may be openings, are aligned on a dolly wheel axis DA, which extends in a direction that is transverse to a direction in which the arm wheel axis WA extends. For example, the dolly wheel axis DA may extend in a direction that is perpendicular to the direction in which the arm wheel axis WA extends when the gauge wheel arm 210 is in this working position.

The dolly 220 is coupled to the gauge wheel arm 210 such that the dolly 220 is swivelable about a swivel axis SA extending through the gauge wheel arm 210 when the gauge wheel arm 210 (and the carried dolly 220) is in the transport position. In some embodiments, the dolly 220 has a dolly post 222 that is disposed in a dolly opening 215 formed in the gauge wheel arm 210. The swivel axis SA may thus extend through the dolly opening 215 and the dolly post 222 so the dolly 220, and the coupled wheels 201A, 201B, can swivel about the dolly post 222 when the gauge wheel arm 210 and the carried dolly 220 are in the transport position. In some embodiments, the dolly 220 rests between the wheels 201A, 201B when the wheels 201A, 201B are coupled to the arm wheel mounts (openings) 211A, 211B and the gauge wheel arm 210 and dolly 220 are in the working position. The dolly 220 may rest between the wheels 201A, 201B in the working position, for example, by forming the dolly opening 215 between the openings 211A, 211B and spacing the openings 211A, 211B apart from one another so the dolly 220 fits between the wheels 201A, 201B when the wheels 201A, 201B are coupled to the openings 211A, 211B.

Moving the gauge wheel arm 210 from the working position, illustrated in FIGS. 2-3, to the transport position, illustrated in FIGS. 5-6, can be a relatively simple and quick process. Starting with the gauge wheel arm 210 and the dolly 220 in the working position and the wheels 201A, 201B attached to the arm wheel mounts 211A, 211B, the wheels 201A, 201B can be uncoupled from the arm wheel mounts 211A, 211B. In some embodiments, the wheels 201A, 201B can abut against the header frame 102 when coupled to the gauge wheel arm 210 in the working position, which helps prevent the gauge wheel arm 210 from pivoting uncontrollably toward the header frame 102. When the wheels 201A, 201B are uncoupled from the arm wheel mounts 211A, 211B while the gauge wheel arm 210 is in the working position, the gauge wheel arm 210 (and the coupled dolly 220) can be pivoted to the transport position, and in some embodiments may be urged to pivot to the transport position by gravity, so long as the gauge wheel arm 210 and/or the dolly 220 are not coupled to any other elements. In some embodiments, a cylinder 230 is coupled to the gauge wheel arm 210 in the working position to control the position of the gauge wheel arm 210 and wheels 201A, 201B during operation of the header 100, and is disconnected before pivoting the gauge wheel arm 210 (and the coupled dolly 220) to the transport position. When the gauge wheel arm 210 (and the coupled dolly 220) is in the transport position, the wheels 201A, 201B can be coupled to the dolly wheels mounts 221A, 221B so the wheels 201A, 201B can be in contact with the ground for transport. To secure the gauge wheel arm 210 in the transport position and reduce the risk of the gauge wheel arm 210 pivoting uncontrollably during transport, an arm lock 202 may be incorporated that is movably coupled to the header frame 102. The gauge wheel arm 210 can include a corresponding arm lock 216 that is configured to couple with the arm lock 202 when the gauge wheel arm 210 is in the transport position to lock the gauge wheel arm 210 in the transport position. The arm locks 202, 216 may be coupled together by, for example, a pin or other type of fastener to lock the gauge wheel arm 210 in the transport position. The coupled arm locks 202, 216 may also help brace the gauge wheel arm 210 to aid in loading when in the transport position. In some embodiments, the arm lock 216 of the gauge wheel arm 210 couples to the cylinder 230 when the gauge wheel arm 210 is in the working position. When the gauge wheel arm 210 (and coupled dolly 220) are in the transport position, a hitch or other type of coupling element may couple to the dolly 220 to a towing vehicle to transport the header 100.

From the foregoing, it should be appreciated that the gauge wheel arm 210 carrying the dolly 220 as the gauge wheel arm 210 pivots between the transport position and the working position simplifies preparing the header 100 for transport. By only needing to uncouple the wheels 101A, 101B from the arm wheel mounts 211A, 211B, if included, or dolly wheel mounts 221A, 221B (and in some embodiments the cylinder 230) to prepare the gauge wheel arm 210 to pivot between the working position and the transport position, only one relatively heavy construction (the wheels 101A, 101B) needs to be handled to make the change. Further, having the gauge wheel arm 210 carry the dolly 220 reduces the number of elements that need to be uncoupled and handled to make the change, which reduces the amount of time to make the change and also reduces the risk that various parts may be lost making the change. Thus, the transport assembly 200 provided according to the present disclosure provides a fast and convenient way to prepare the header 100 for working or transport.

Figure 7:
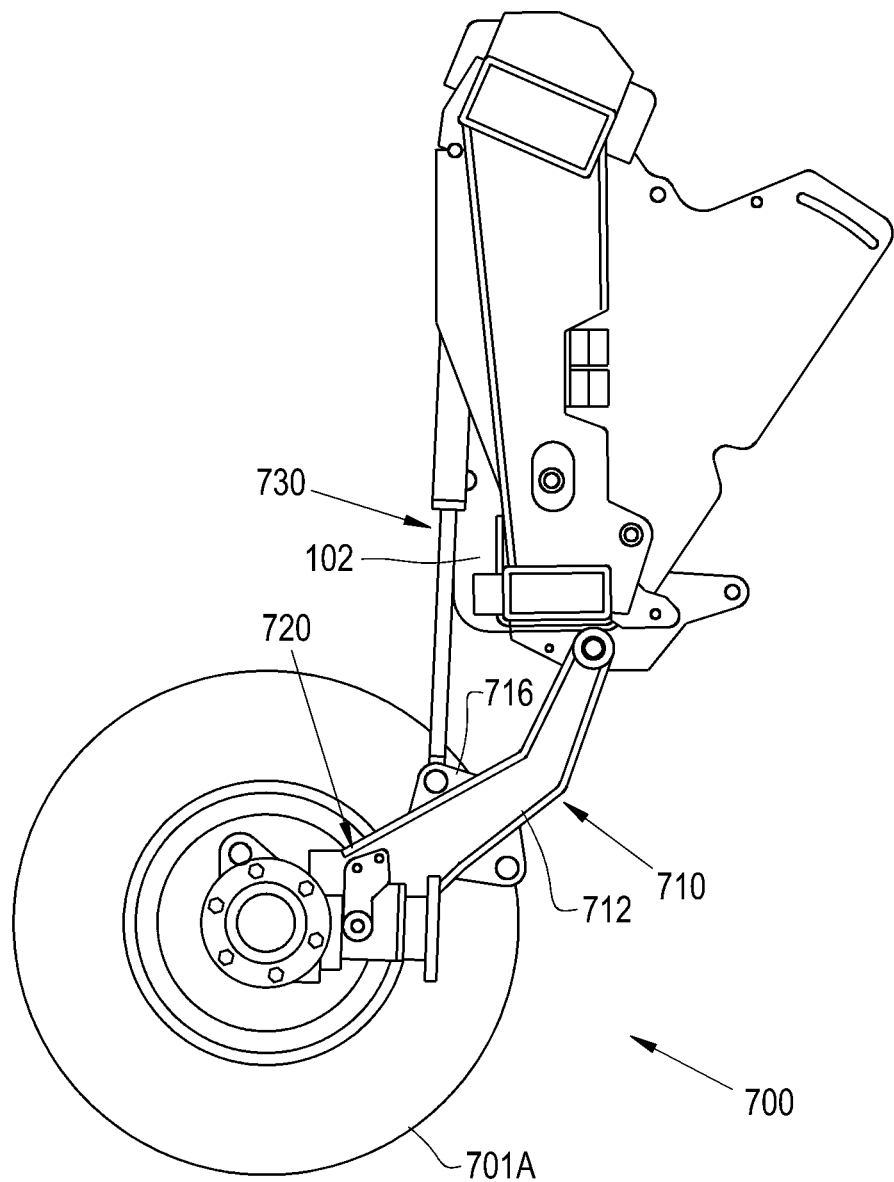
FIG. 7 illustrates another exemplary embodiment of a transport assembly that may be incorporated in the header of FIG. 1 with a gauge wheel arm in a working position, in accordance with an exemplary embodiment of the present disclosure.
Figure 8:
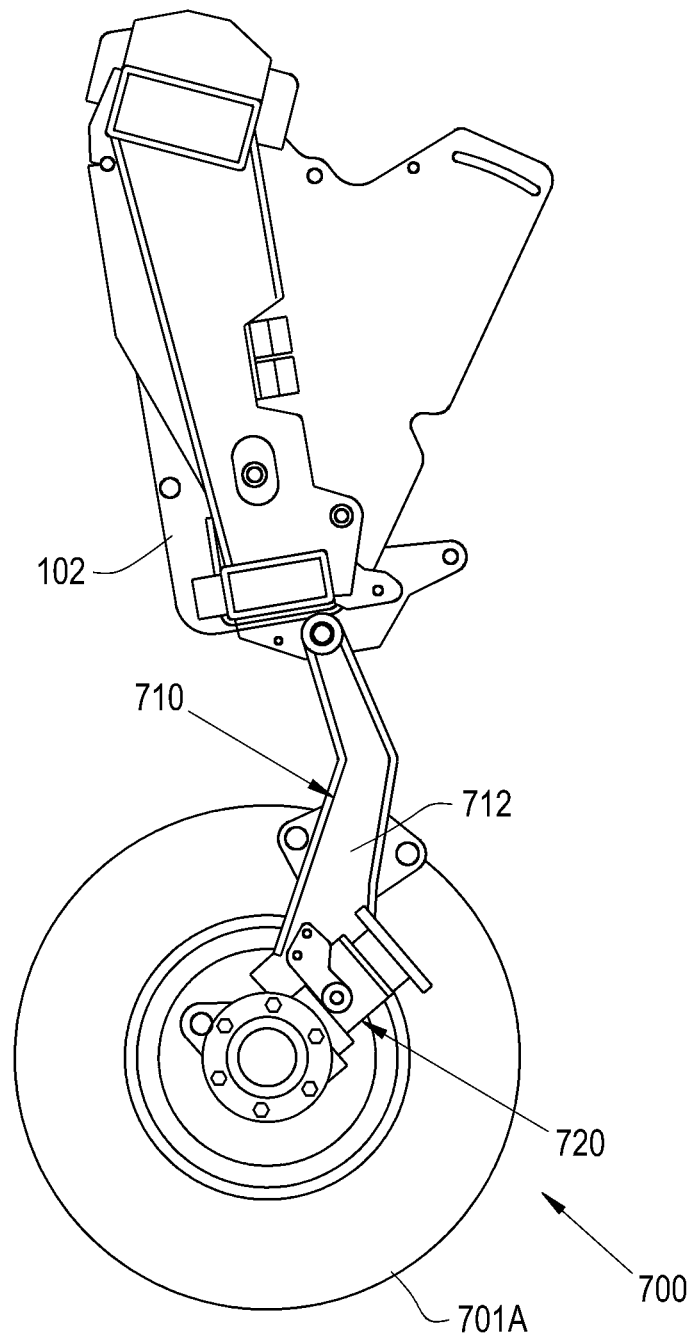
FIG. 8 illustrates the transport assembly of FIG. 7 with the gauge wheel arm midway between moving from the working position to a transport position.
Figure 9:
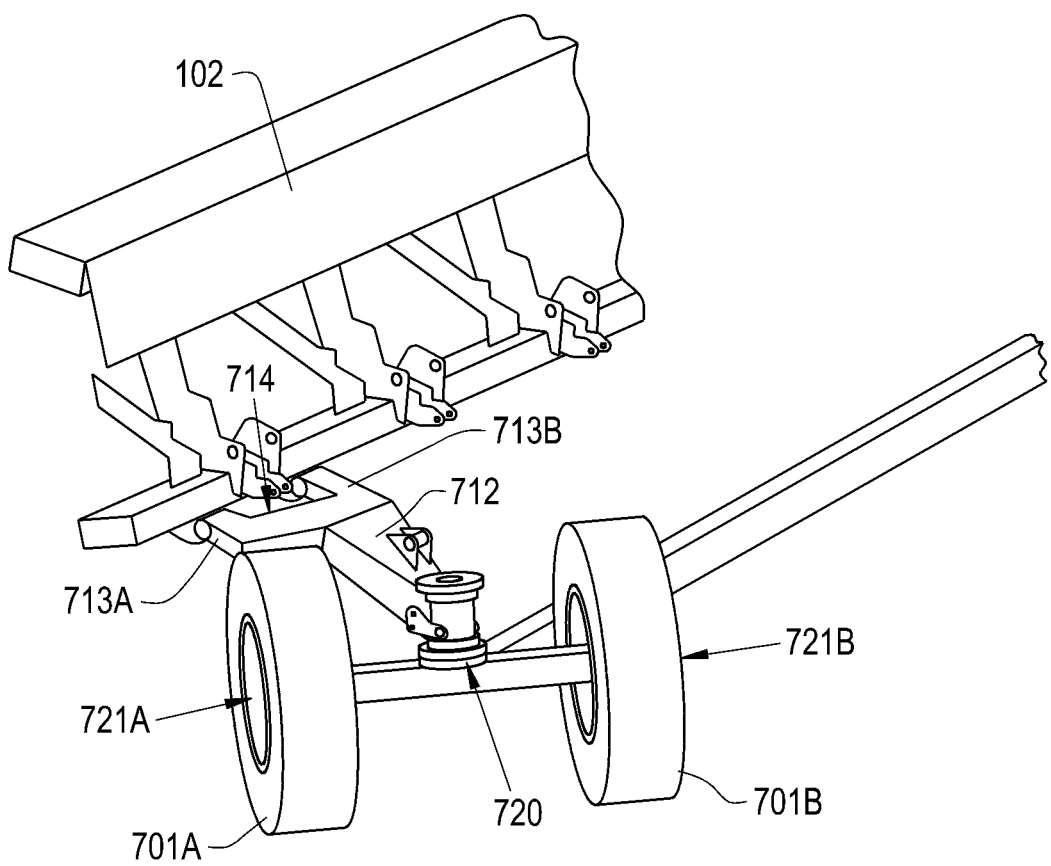
FIG. 9 illustrates the transport assembly of FIGS. 7-8 with the gauge wheel arm in the transport position and a carried dolly swivelling.
Figure 10:
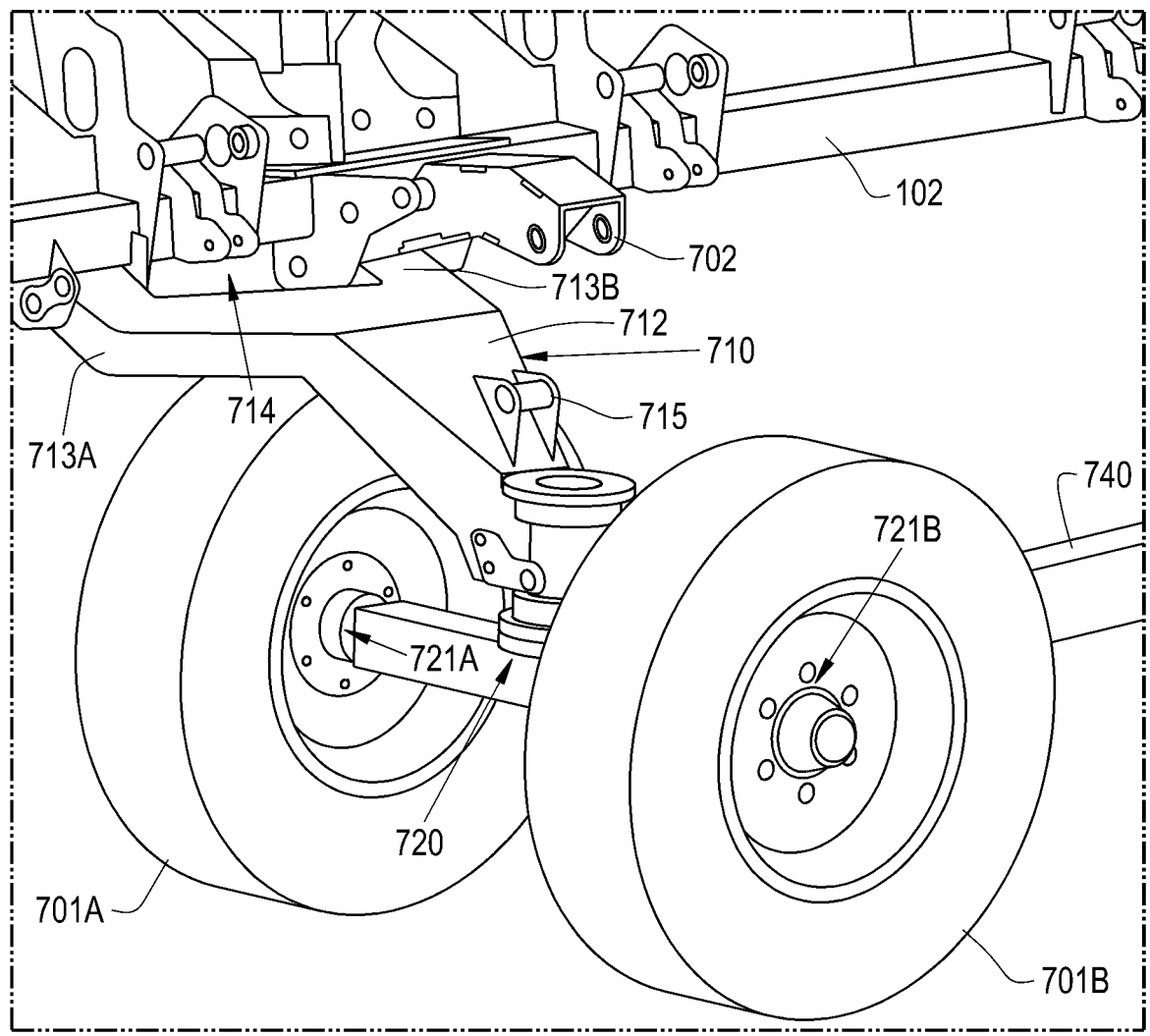
FIG. 10 illustrates the transport assembly of FIGS. 7-9 with the gauge wheel arm in the transport position and the carried dolly coupled to a hitch.
Figure 11:
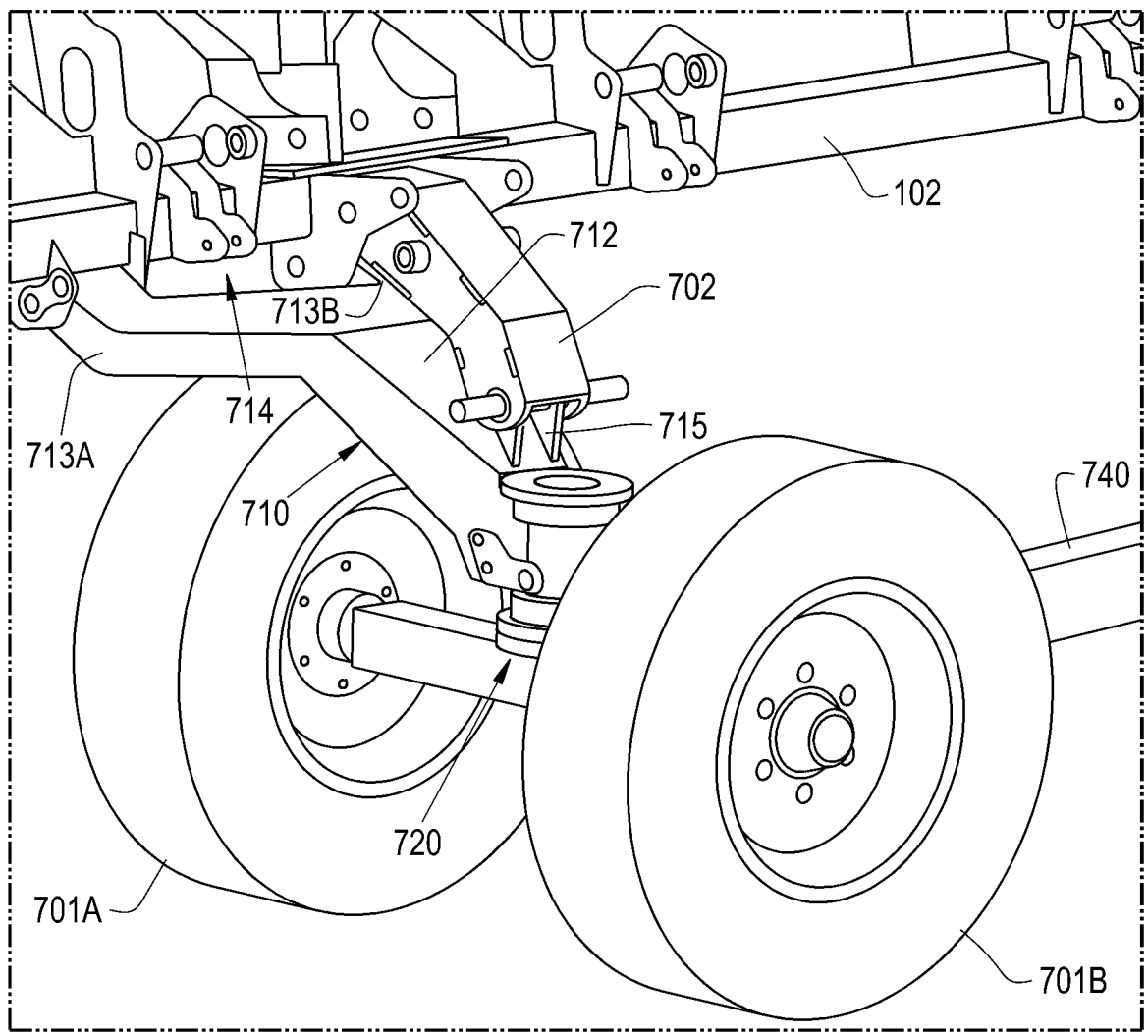
FIG. 11 illustrates the transport assembly of FIGS. 7-10 with an arm lock locking the gauge wheel arm in the transport position.

Referring now to FIGS. 7-11, another exemplary embodiment of a transport assembly 700 provided according to the present disclosure is illustrated. The transport assembly 700 includes a gauge wheel arm 710 and a dolly 720, similarly to the previously described transport assembly 200. The gauge wheel arm 710 is pivotably coupled to the header frame 102 and pivotable between a working position, illustrated in FIG. 7, and a transport position, illustrated in FIGS. 9-11. FIG. 8 illustrates the gauge wheel arm 710, and the carried dolly 720, pivoting between the working position and the transport position.

Unlike the previously described gauge wheel arm 210, the gauge wheel arm 710 has a body section 712 and a pair of mounting arms 713A, 713B that pivotably couple the body section 712 to the header frame 102 but does not include arm wheel mounts for mounting wheels thereto. As illustrated, there is a gap 714 between the mounting arms 713A, 713B so the gauge wheel arm 710 has a shape similar to a Y-shape, but it should be appreciated that the position and orientation of the mounting arms 713A, 713B relative to the body section 712 can be adjusted so the gauge wheel arm 710 has a different shape. The header frame 102 can include an arm lock 702 and the body section 712 can include a corresponding arm lock 715 that is configured to couple with the arm lock 702 when the gauge wheel arm 710 is in the transport position to lock the gauge wheel arm 710 in the transport position. The arm lock 702 may be pivotably coupled to the header frame 102 so the arm lock 702 can pivot between an unlock position, illustrated in FIG. 10, and a lock position, illustrated in FIG. 11.

As illustrated in FIG. 7, the gauge wheel arm 710 may be coupled to a cylinder 740 in the working position. The cylinder 740 may, for example, couple to a cylinder bracket 716 coupled to the body section 712. The cylinder 740 may be uncoupled from the gauge wheel arm 710 before moving the gauge wheel arm 710 from the working position to the transport position.

Similarly to the previously described dolly 220, the dolly 720 is carried by the gauge wheel arm 710 and includes a pair of dolly wheel mounts 721A, 721B configured to couple wheels 701A, 701B thereto. Unlike the previously described dolly 220, which may only be mounted to wheels 101A, 101B when the gauge wheel arm 210 is in the transport position, the wheels 701A, 701B may be coupled to the dolly wheel mounts 721A, 721B of the dolly 720 at all times, eliminating the need to uncouple the wheels 701A, 701B from the gauge wheel arm 710 when pivoting the gauge wheel arm 710 between the transport position and the working position. The dolly 720 is coupled to the gauge wheel arm 710 such that the dolly 720 can swivel when the gauge wheel arm 710 is in the transport position. Once the gauge wheel arm 710 moves to the transport position, carrying the dolly 720 with it, the dolly 720 can be coupled to a hitch 730 or other element that can couple the header 100 to a towing vehicle. The dolly 720 can also be similar to the previously described dolly 220 in other respects.

Figure 12:
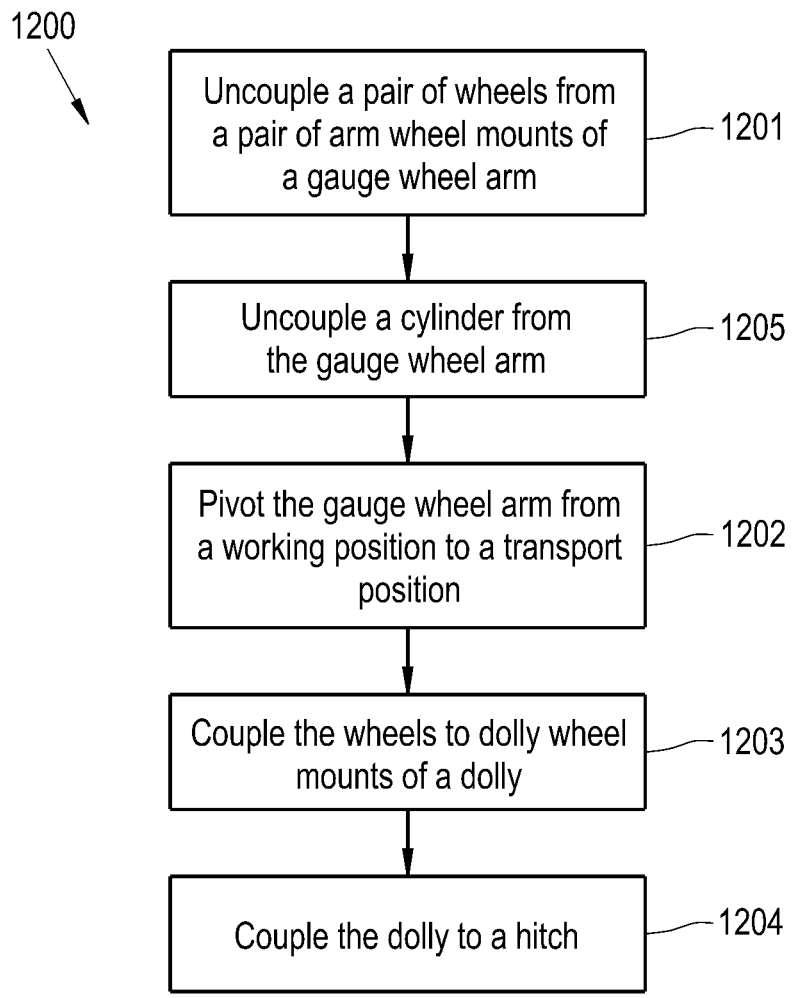
FIG. 12 illustrates an exemplary embodiment of a method of preparing the header of FIG. 1 for transport, provided in accordance with an exemplary embodiment of the present disclosure.

Referring now to FIG. 12, an exemplary embodiment of a method 1200 of preparing a header, such as the agricultural header 100 of FIG. 1, for transport is illustrated. The method 1200 includes uncoupling 1201 a pair of wheels 101A, 101B from a pair of arm wheel mounts 211A, 211B of a gauge wheel arm 210 and pivoting 1202 the gauge wheel arm 210 from a working position to a transport position. Pivoting 1202 the gauge wheel arm 210 from the working position to the transport position also carries a dolly 220 that is coupled to the gauge wheel arm 210 to pivot. When the gauge wheel arm 210 (and the carried dolly 220) is in the transport position, the wheels 101A, 101B are coupled 1203 to dolly wheel mounts 221A, 221B of the dolly 220. The dolly 220 may be coupled 1204 to a hitch 730 or other element to couple the header 100 to a towing vehicle, allowing the towing vehicle to tow the header 100. In some embodiments, a cylinder 230 is uncoupled 1205 from the gauge wheel arm 210 prior to pivoting 1202 the gauge wheel arm 210 from the working position to the transport position. Thus, it should be appreciated that the method 1200 provided according to the present disclosure represents an elegant solution to preparing the header 100 for transport that does not require many actions or tools.

Figure 13:
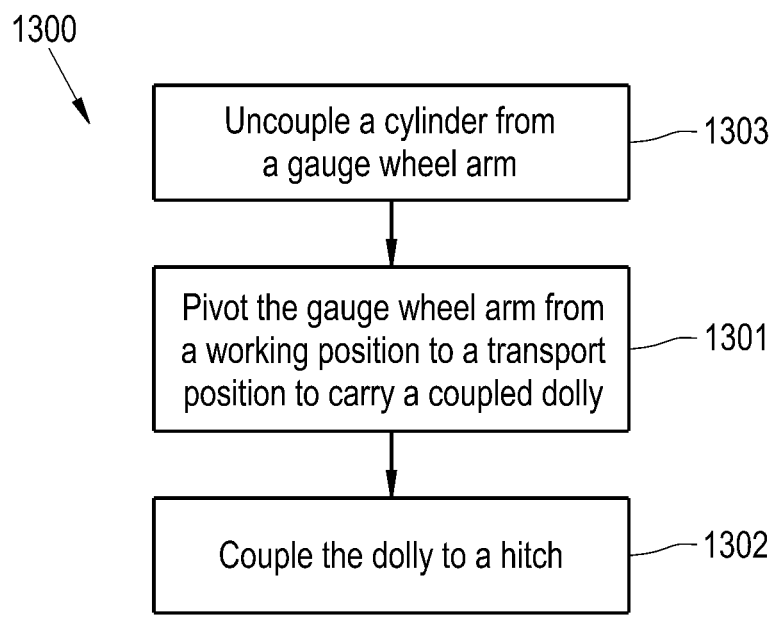
FIG. 13 illustrates another exemplary embodiment of a method of preparing the header of FIG. 1 for transport, provided in accordance with an exemplary embodiment of the present disclosure.

Referring now to FIG. 13, another exemplary embodiment of a method 1300 of preparing a header, such as the agricultural header 100 of FIG. 1, for transport is illustrated. The method 1300 includes pivoting 1301 a gauge wheel arm 710 from a working position to a transport position Pivoting 1301 the gauge wheel arm 710 from the working position to the transport position also carries a dolly 720 that is coupled to the gauge wheel arm 710. Wheels 701A, 701B are coupled to dolly wheel mounts 721A, 721B of the dolly 720, and are thus also carried by the gauge wheel arm 710 as the gauge wheel arm 710 pivots between the working position and the transport position. The dolly 720 may be coupled 1302 to a hitch 730 or other element to couple the header 100 to a towing vehicle, allowing the towing vehicle to tow the header 100. In some embodiments, a cylinder 740 is uncoupled 1303 from the gauge wheel arm 710 prior to pivoting 1301 the gauge wheel arm 710 from the working position to the transport position. Thus, it should be appreciated that the method 1300 provided according to the present disclosure also represents an elegant solution to preparing the header 100 for transport that does not require many actions or tools.

Referring now to FIGS. 14-17, another exemplary embodiment of a transport assembly 1400 provided according to the present disclosure is illustrated. The transport assembly 1400 includes a gauge wheel arm 1410 and a dolly 1420, similarly to the previously described transport assemblies 200 and 700. The gauge wheel arm 1410 is pivotably coupled to the header frame 102 and pivotable between a transport position, illustrated in FIGS. 14-15, and a working position, similar to the previously described gauge wheel arms 210, 710. The dolly 1420 may include a pair of dolly wheel mounts 1421 that each respectively couple to a dolly wheel 1422, with only one dolly wheel 1422 being illustrated.

The transport assembly 1400 further includes a latch assembly 1450 that is carried by the header frame 102. The gauge wheel arm 1410 is pivotable with respect to the latch assembly 1450, the significance of which will be described further herein. The latch assembly 1450 includes a movable lever 1451, a locking bolt 1452 carried by the lever 1451, and a lock 1453 that extends through a lever slot 1454 formed in the lever 1451. The lock 1453 has a lock groove 1455 formed therein that can engage a side of the lever slot 1454 when the lever 1451 has been moved, as will be described further herein.

Figure 14:
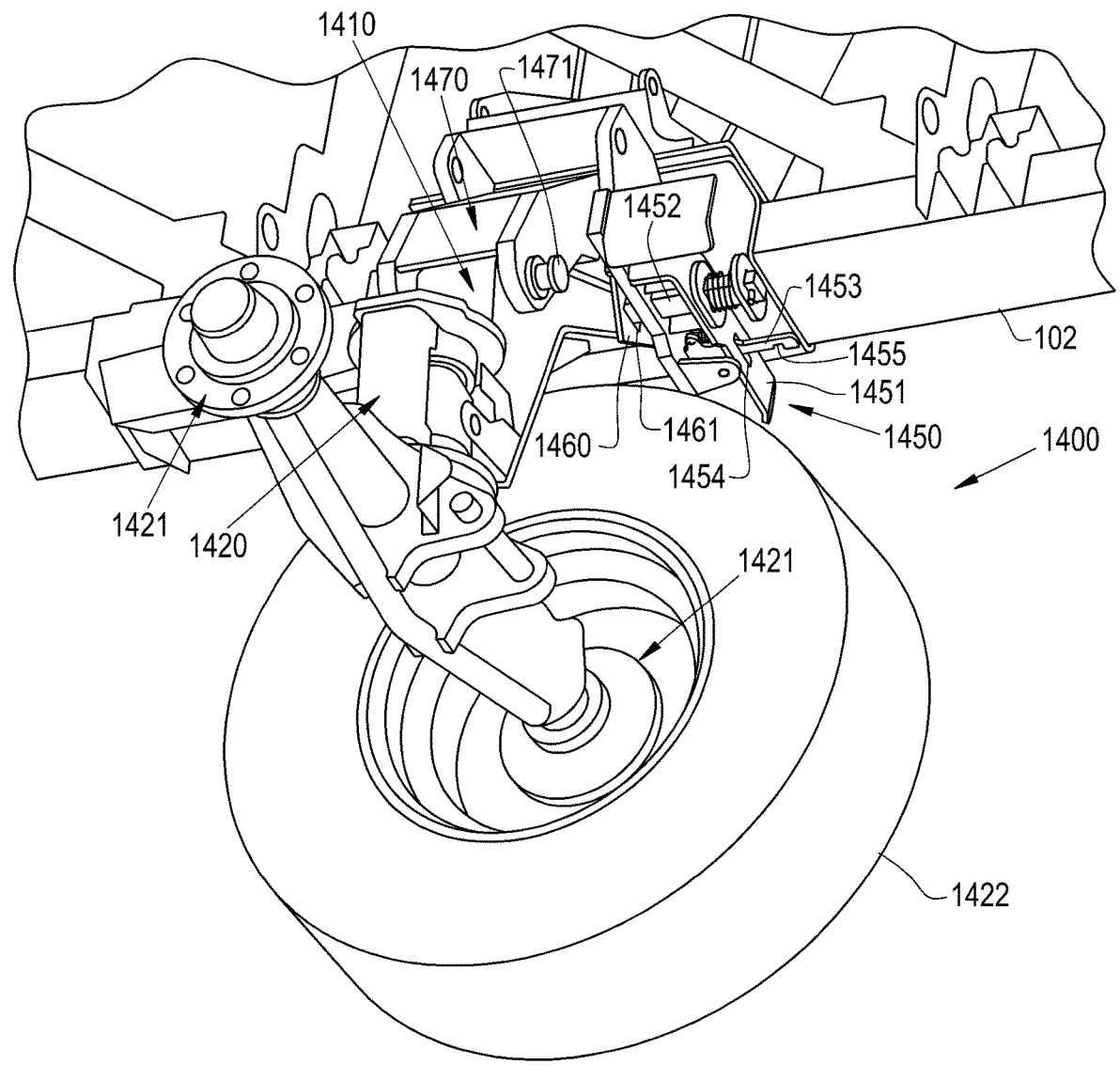
FIG. 14 illustrates another exemplary embodiment of a transport assembly that includes a latch assembly and may be incorporated in the header of FIG. 1 with a gauge wheel arm in a transport position, in accordance with an exemplary embodiment of the present disclosure.

The gauge wheel arm 1410 includes a coupling bracket 1460 that is carried by the gauge wheel arm 1410 and has a coupling slot 1461 that is formed therein. When the gauge wheel arm 1410 is in the transport position, the locking bolt 1452 is partially disposed in the coupling slot 1461 so the gauge wheel arm 1410 is locked in position, as illustrated in FIGS. 14-15.

Figure 15:
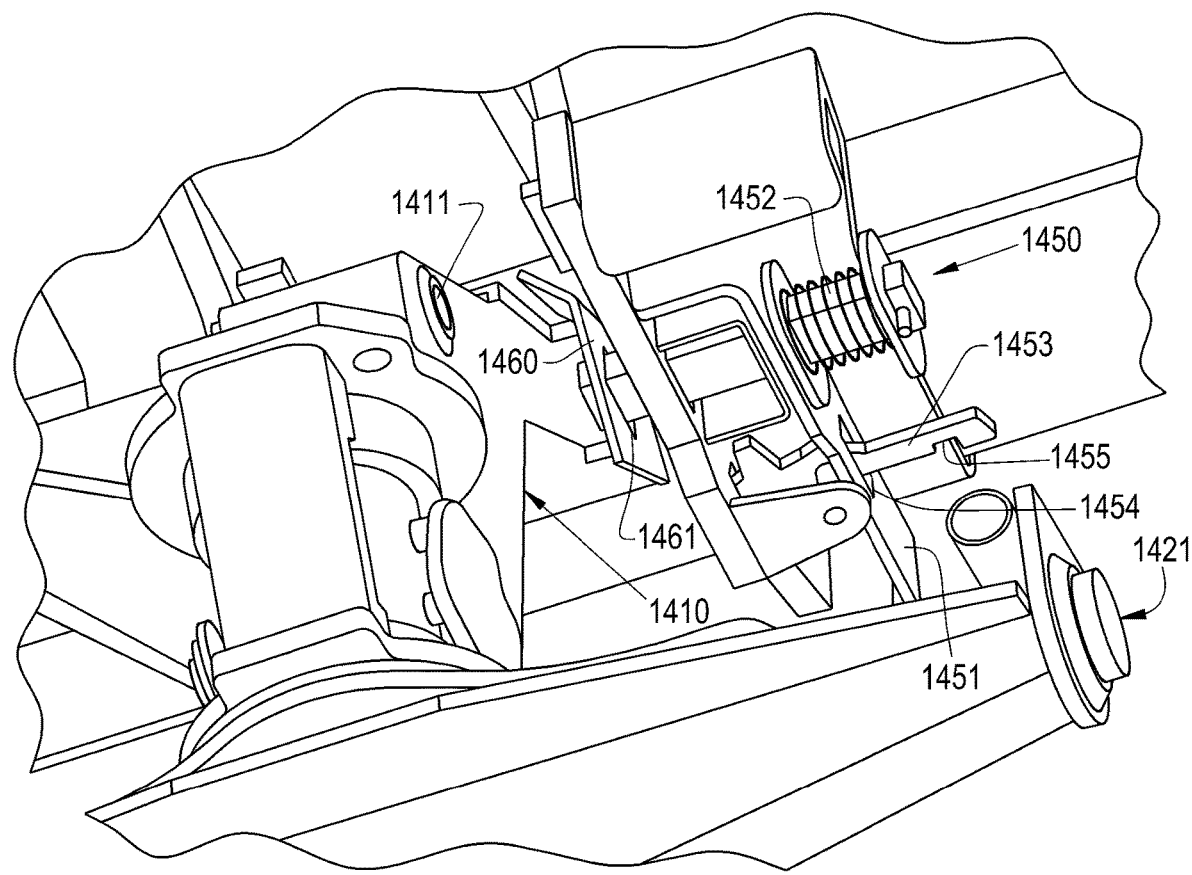
FIG. 15 illustrates a close-up view of the latch assembly illustrated FIG. 14.
Figure 16:
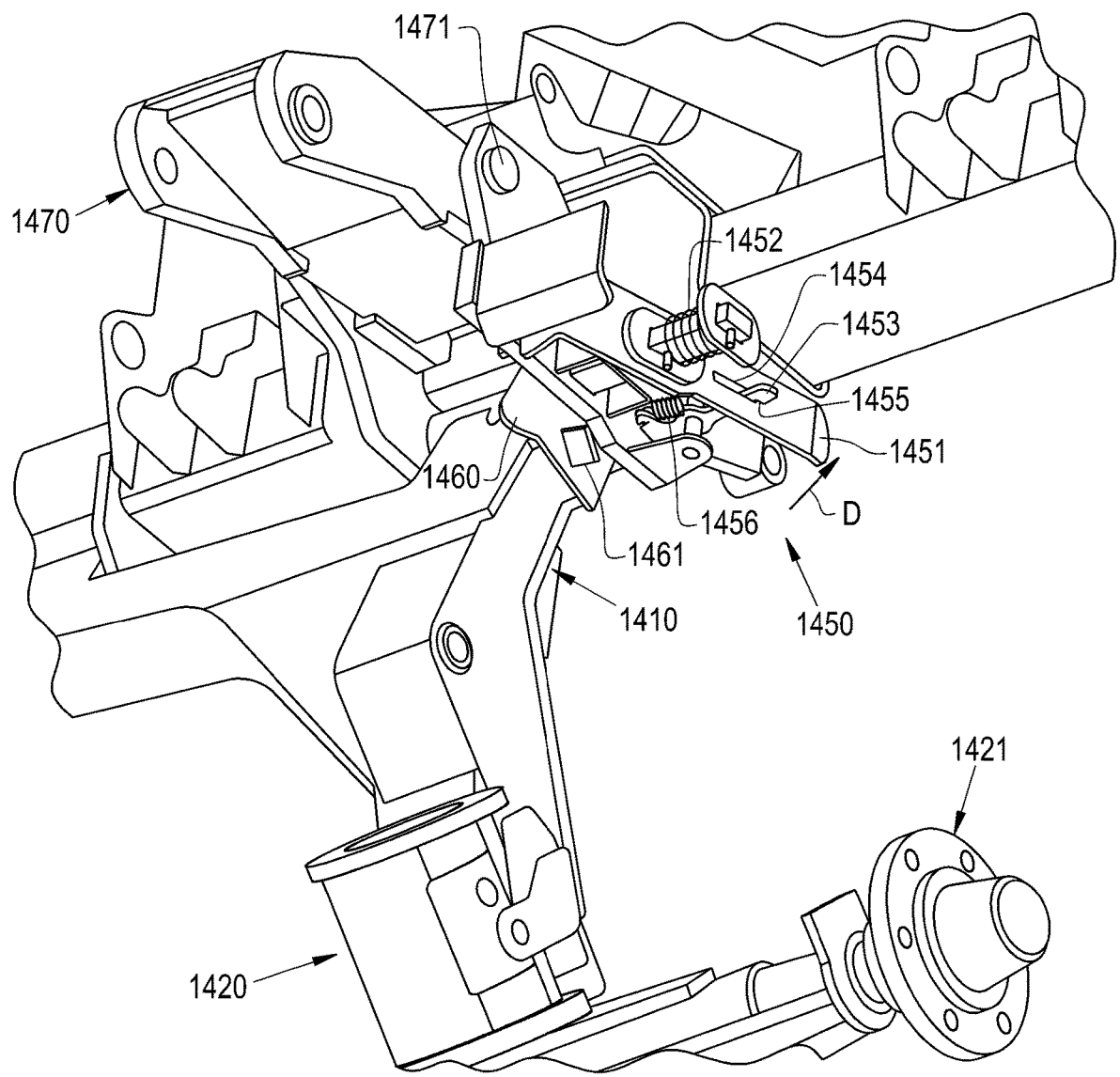
FIG. 16 illustrates the transport assembly of FIGS. 14-15 when a lever of the latch assembly has been pulled to allow the gauge wheel arm to pivot towards a working position.
Figure 17:
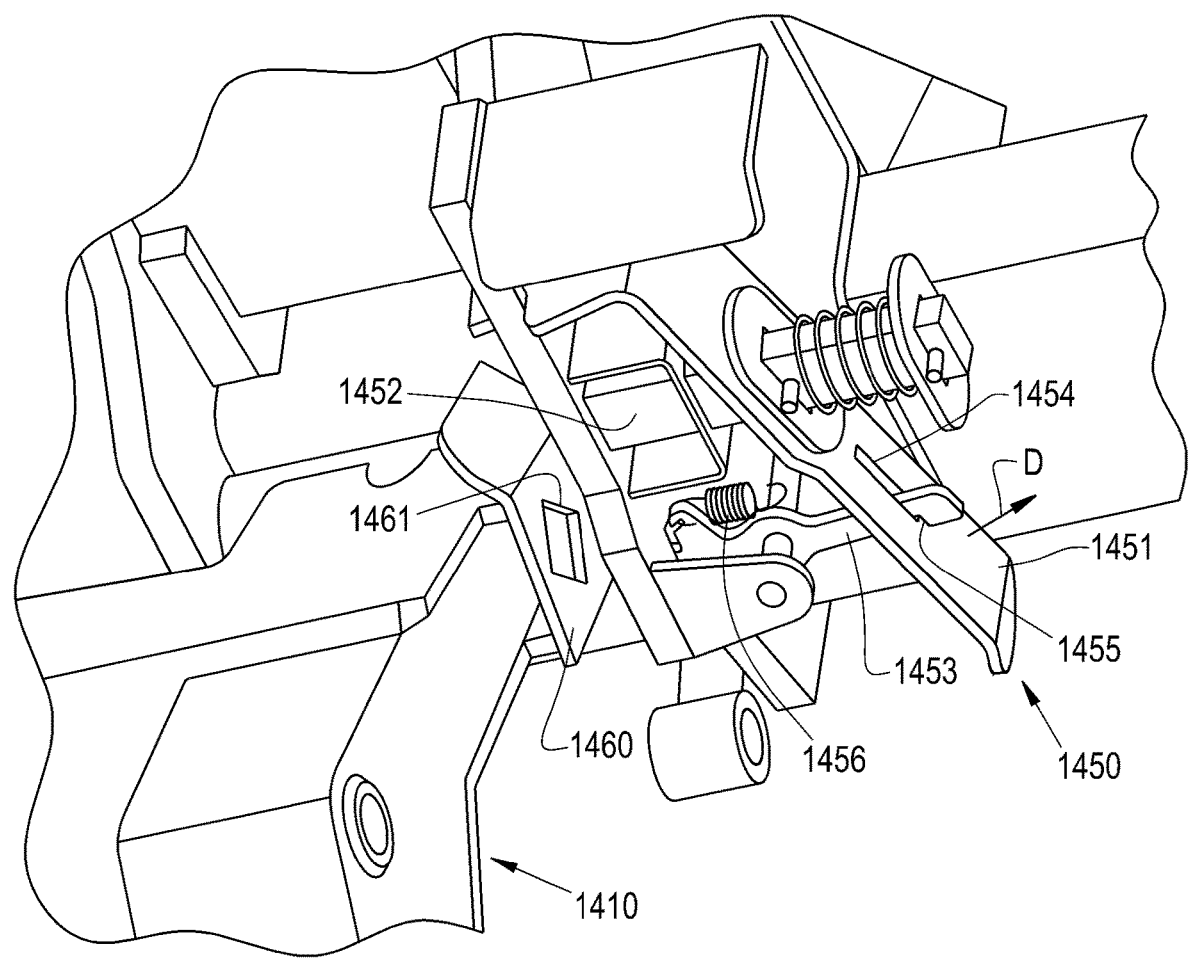
FIG. 17 illustrates a close-up view of the latch assembly of FIG. 16 when the lever has been pulled.

To unlock the gauge wheel arm 1410 so the gauge wheel arm 1410 can be pivoted to the working position, and referring specifically now to FIGS. 15-17, a user can uncouple a locking structure 1470 from the gauge wheel arm 1410 by removing pins 1471 from respective openings 1411 (illustrated in FIG. 15) in the gauge wheel arm 1410 and moving the locking structure 1470 away from the gauge wheel arm 1410. The lever 1451 can be pulled in a direction D to a release position, as illustrated in FIGS. 16-17. As the lever 1451 is pulled to the release position, the locking bolt 1452 is carried out of the coupling slot 1461 by the lever 1451. When the locking bolt 1452 is out of the coupling slot 1461, the gauge wheel arm 1410 is free to pivot towards the working position and will generally freely pivot towards the working position due to the effects of gravity. The lock groove 1455 of the lock 1453 can engage the side of the lever slot 1454 when the lever 1451 is in the release position, which holds the lever 1451 and the locking bolt 1452 in place. A spring 1456 coupled to the lock 1453 can keep the lock groove 1455 engaged with the side of the lever slot 1454 so the lever 1451 is held in the release position. To lock the gauge wheel arm 1410 back in the transport position, the gauge wheel arm 1410 can be moved back to the transport position so the coupling slot 1461 is aligned with the locking bolt 1452. The lock 1453 can then be moved so the lock groove 1455 disengages from the side of the lever slot 1454 and the lever 1451 is free to move back to its original position and carry the locking bolt 1452 back into the coupling slot 1461 to lock the gauge wheel arm 1410 in place.

The latch assembly 1450 may be included, for example, when the dolly wheels 1422 are so heavy that they are difficult to hold in place while aligning and inserting one or more latch pins, such as pin 1471. When moving the gauge wheel arm 1410 to the transport position, the user can release the lock 1453 to release the gauge wheel arm 1451 and release the bolt 1452 back to the latched position. The user can then swing the gauge wheel arm 1451, which is heavy, to the transport position. The latch assembly 1450 will catch the gauge wheel arm 1452 because the locking bolt 1452 will be displaced laterally by the coupling bracket 1460 until the locking bolt 1452 is pressed into the coupling slot 1461 formed in the coupling bracket 1460. In some embodiments, the locking bolt 1452 is chamfered to slide along the coupling 1460 until the locking bolt 1452 rests in the coupling slot 1461. When the locking bolt 1452 is in the coupling slot 1461, the entire gauge wheel arm 1410 is semi-held in place until the locking structure 1470 is brought down. As illustrated in FIG. 16, the locking structure 1470 can be held up by the pin 1471. The pin 1471 can be removed to release the locking structure 1470 and allow the user to bring down the locking structure 1470 to the position illustrated in FIG. 14. Then, the user can insert the pin 1471 through the opening 1411 to couple the gauge wheel arm 1410 to the locking structure 1470. Therefore, it should be appreciated that the latch assembly 1450 provided according to present disclosure provides a convenient and easy way to help hold the gauge wheel arm 1410 in the transport position. It should be further appreciated that, other than including the latch assembly 1450, the transport assembly 1400 can be similar to the previously described transport assemblies 200, 700.

These and other advantages of the present invention will be apparent to those skilled in the art from the foregoing specification. Accordingly, it is to be recognized by those skilled in the art that changes or modifications may be made to the above-described embodiments without departing from the broad inventive concepts of the invention. It is to be understood that this invention is not limited to the particular embodiments described herein, but is intended to include all changes and modifications that are within the scope and spirit of the invention.

What is claimed is:

1. An agricultural header for an agricultural vehicle, comprising:
   a header frame;
   at least one cutter carried by the header frame and configured to cut crop material; and
   a transport assembly coupled to the header frame, the transport assembly comprising:
      a gauge wheel arm that is pivotably coupled to the header frame and pivotable between a transport position and a working position; and
      a dolly coupled to the gauge wheel arm and comprising a pair of dolly wheel mounts configured to mount a pair of wheels thereto, the dolly being coupled to the gauge wheel arm such that the dolly is carried by the gauge wheel arm between the transport position and the working position and is swivelable about a swivel axis extending through the gauge wheel arm when the gauge wheel arm is in the transport position,
      wherein the gauge wheel arm comprises a body section comprising (i) a pair of arm wheel mounts configured to mount the pair of wheels thereto, (ii) a pair of mounting arms coupling the body section to the header frame, and (iii) a dolly opening defined between the pair of arm wheel mounts and the pair of mounting arms,
      wherein the pair of arm wheel mounts comprises a first pair of openings formed in the gauge wheel arm, the first pair of openings extending along a first axis,
      wherein the pair of mounting arms comprises a second pair of openings formed in the gauge wheel arm, the second pair of openings extending along a second axis,
      wherein the dolly opening extends along a third axis that is coincident with the swivel axis and transverse to the first and second axes, and wherein the third axis is disposed along the body section at a location between the first and second axes.

2. The agricultural header of claim 1, wherein the dolly comprises a dolly post disposed in the dolly opening.

3. The agricultural header of claim 1, wherein the dolly wheel mounts are aligned on a dolly wheel axis, the dolly wheel axis extending in a direction that is transverse to a direction in which the first axis extends.

4. The agricultural header of claim 3, wherein the dolly wheel axis extends in a direction that is perpendicular to the direction in which the first axis extends when the gauge wheel arm is in the working position.

5. The agricultural header of claim 1, further comprising an arm lock movably coupled to the header frame, the gauge wheel arm comprising a corresponding arm lock that is configured to couple with the arm lock when the gauge wheel arm is in the transport position to lock the gauge wheel arm in the transport position.

6. The agricultural header of claim 1, further comprising a pair of wheels, each of the wheels being coupled to a respective one of the dolly wheel mounts.

7. The agricultural header of claim 1, further comprising a cylinder coupled to the gauge wheel arm when the gauge wheel arm is in the working position.

8. An agricultural vehicle, comprising:
a chassis; and
a header carried by the chassis, the header comprising:
 a header frame;
 at least one cutter carried by the header frame and configured to cut crop material; and
 a transport assembly coupled to the header frame, the transport assembly comprising:
  a gauge wheel arm that is pivotably coupled to the header frame and pivotable between a transport position and a working position; and
  a dolly coupled to the gauge wheel arm and comprising a pair of dolly wheel mounts configured to mount a pair of wheels thereto, the dolly being coupled to the gauge wheel arm such that the dolly is carried by the gauge wheel arm between the transport position and the working position and is swivelable about a swivel axis extending through the gauge wheel arm when the gauge wheel arm is in the transport position,
 wherein the gauge wheel arm comprises a body section comprising (i) a pair of arm wheel mounts configured to mount the pair of wheels thereto, (ii) a pair of mounting arms coupling the body section to the header frame, and (iii) a dolly opening defined between the pair of arm wheel mounts and the pair of mounting arms,
 wherein the pair of arm wheel mounts comprises a first pair of openings formed in the gauge wheel arm, the first pair of openings extending along a first axis,
 wherein the pair of mounting arms comprises a second pair of openings formed in the gauge wheel arm, the second pair of openings extending along a second axis,
 wherein the dolly opening extends along a third axis that is coincident with the swivel axis and transverse to the first and second axes, and
 wherein the third axis is disposed along the body section at a location between the first and second axes.

9. The agricultural vehicle of claim 8, wherein the dolly comprises a dolly post disposed in the dolly opening.

10. The agricultural vehicle of claim 8, wherein the dolly wheel mounts are aligned on a dolly wheel axis, the dolly wheel axis extending in a direction that is transverse to a direction in which the first axis extends.

11. The agricultural vehicle of claim 10, wherein the dolly wheel axis extends in a direction that is perpendicular to the direction in which first axis extends when the gauge wheel arm is in the working position.

12. The agricultural vehicle of claim 8, further comprising an arm lock movably coupled to the header frame, the gauge wheel arm comprising a corresponding arm lock that is configured to couple with the arm lock when the gauge wheel arm is in the transport position to lock the gauge wheel arm in the transport position.

13. The agricultural vehicle of claim 8, further comprising a pair of wheels, each of the wheels being coupled to a respective one of the dolly wheel mounts.

14. The agricultural vehicle of claim 8, further comprising a cylinder coupled to the gauge wheel arm when the gauge wheel arm is in the working position.

\* \* \* \* \*